United States Patent
Terao

(10) Patent No.: US 8,090,728 B2
(45) Date of Patent: Jan. 3, 2012

(54) IMAGE PROCESSING APPARATUS, CONTROL METHOD THEREOF, AND STORAGE MEDIUM THAT STORES PROGRAM THEREOF

(75) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 12/181,278

(22) Filed: Jul. 28, 2008

(65) Prior Publication Data

US 2009/0037463 A1 Feb. 5, 2009

(30) Foreign Application Priority Data

Jul. 30, 2007 (JP) ................................. 2007-197733

(51) Int. Cl.
*G06F 17/30* (2006.01)
(52) U.S. Cl. .................. 707/754; 707/769; 715/201
(58) Field of Classification Search .............. 707/E17.019–E17.027, 754, 769; 715/201
See application file for complete search history.

(56) References Cited

U.S. PATENT DOCUMENTS

| 7,349,577 B2 | 3/2008 | Kaneda et al. ................ 382/190 |
| 7,391,917 B2 | 6/2008 | Ohta et al. .................... 382/253 |
| 2002/0103813 A1* | 8/2002 | Frigon ....................... 707/104.1 |
| 2006/0045386 A1 | 3/2006 | Fukuoka et al. .............. 382/305 |
| 2006/0288278 A1* | 12/2006 | Kobayashi .................... 715/523 |

FOREIGN PATENT DOCUMENTS

| JP | 2004-265384 | 9/2004 |
| JP | 2006-277473 | 10/2006 |
| WO | 2004/068368 | 8/2004 |

* cited by examiner

*Primary Examiner* — Shahid Alam
*Assistant Examiner* — Jagdish Pandya
(74) *Attorney, Agent, or Firm* — Fitzpatrick, Cella, Harper & Scinto

(57) ABSTRACT

Conventionally, there are problems in that object data extracted from an original document is not object data divided into object units a user desires, and that scan data cannot be handled in the object data units when reusing the scan data. To solve these problems, the image processing apparatus extracts each object included in the original document; stores object data of each extracted object with a keyword in a storage device; and visualizes each object data on a display unit. When making multiple selection of the visualized object data individually in accordance with a user instruction, the keywords associated with the plurality of object data selected are displayed. Besides, it is made possible to change the keywords associated with the plurality of object data selected.

9 Claims, 9 Drawing Sheets

IMAGE PROCESSING APPARATUS, CONTROL METHOD THEREOF, AND STORAGE MEDIUM THAT STORES PROGRAM THEREOF

BACKGROUND OF THE INVENTION

1. Field of the Invention

The present invention relates to technology to improve the reusability of object data in an image processing apparatus capable of separating objects from an original document image.

2. Description of Related Art

Conventionally, there has been a technology as disclosed in Japanese Patent Laid-Open No. 2004-265384, which separates object data from scan data obtained by reading an original document, and applies an editing function to the object data. The technology performs the following processing when separating objects from the scan data:

(1) Divides the scan data on an object by object basis;
(2) Classifies each object data in the scan data to an item having an attribute such as TEXT, GRAPHIC, and IMAGE, for example; and,
(3) Converts the object data with the attribute of TEXT or GRAPHIC to vector data by vectorization, and the object data with the attribute of IMAGE to image data such as JPEG.

The object data separated as described above can be edited using an editing function.

In addition, there is a technology as disclosed in Japanese Patent Laid-Open No. 2006-277473, which adds attribute information data (a keyword) chosen by a user to the scan data afterward for improving search ability.

SUMMARY OF THE INVENTION

The foregoing technology, however, has a problem in that because the object data are automatically decided and generated in the image processing apparatus, they are not always the object data in object units the user desires.

As for the technology disclosed in Japanese Patent Laid-Open No. 2006-277473, even though it tries to reuse scan data stored in the image processing apparatus by searching for the scan data using a keyword for search, the entire scan data becomes the reusable data. Accordingly, when reusing the scan data, a problem arises in that the scan data cannot be handled in the object data units.

As a result, to reuse the scan data in the object data units, it is necessary to cut out only the object data from the scan data again, and this prevents the improvement in the user convenience.

To solve the foregoing problems, the present invention has the following features.

In the first aspect of the present invention, there is provided an image processing apparatus comprising: means for extracting each object included in an original document, and for storing object data of each extracted object with a keyword in a storage device; means for visualizing each object data on a display unit; selecting means for making multiple selections of the visualized object data individually in accordance with a user instruction; means for displaying the keywords associated with the plurality of object data selected by the selecting means; and keyword assigning means for changing the keywords associated with the plurality of object data selected.

In the second aspect of the present invention, there is provided a control method for an image processing apparatus comprising: a step of extracting each object included in an original document, and of storing object data of each extracted object with a keyword in a storage device; a step of visualizing each object data stored in the storage device on a display unit; a selecting step of selecting more than one of the visualized object data in accordance with a user instruction via a GUI on the display unit; a step of displaying on the display unit the keywords associated with the object data selected; and a keyword assigning step of changing the keywords associated with the plurality of object data selected via the GUI on the display unit.

In the third aspect of the present invention, there is provided a computer readable storage medium that stores a program for causing a computer for controlling an image processing apparatus to execute: a step of extracting each object included in an original document, and of storing object data of each extracted object with a keyword in a storage device; a step of visualizing each object data stored in the storage device on a display unit; a selecting step of selecting more than one of the visualized object data in accordance with a user instruction via a GUI on the display unit; a step of displaying on the display unit the keywords associated with the object data selected; and a keyword assigning step of changing the keywords associated with the plurality of object data selected via the GUI on the display unit.

In the present specification, the term "image processing apparatus" includes, in addition to dedicated image processing apparatuses and image forming apparatuses, general-purpose information processing apparatuses capable of executing the processing in accordance with the present invention.

According to the present invention, it is possible to integrate or divide the object data the user desires on a screen of the image processing apparatus even if the scan data is divided automatically in the object units the user does not desire when the image processing apparatus generates the object data. In addition, the user can add a desired keyword or change to a desired keyword on an object data unit basis afterward. This makes it possible to facilitate the search on an object unit basis and the reuse of the object data, thereby being able to improve the user convenience.

Further features of the present invention will become apparent from the following description of exemplary embodiments (with reference to the attached drawings).

DESCRIPTION OF THE EMBODIMENTS

First Embodiment

The embodiments in accordance with the present invention will now be described in detail with reference to the accompanying drawings.

Figure 1:
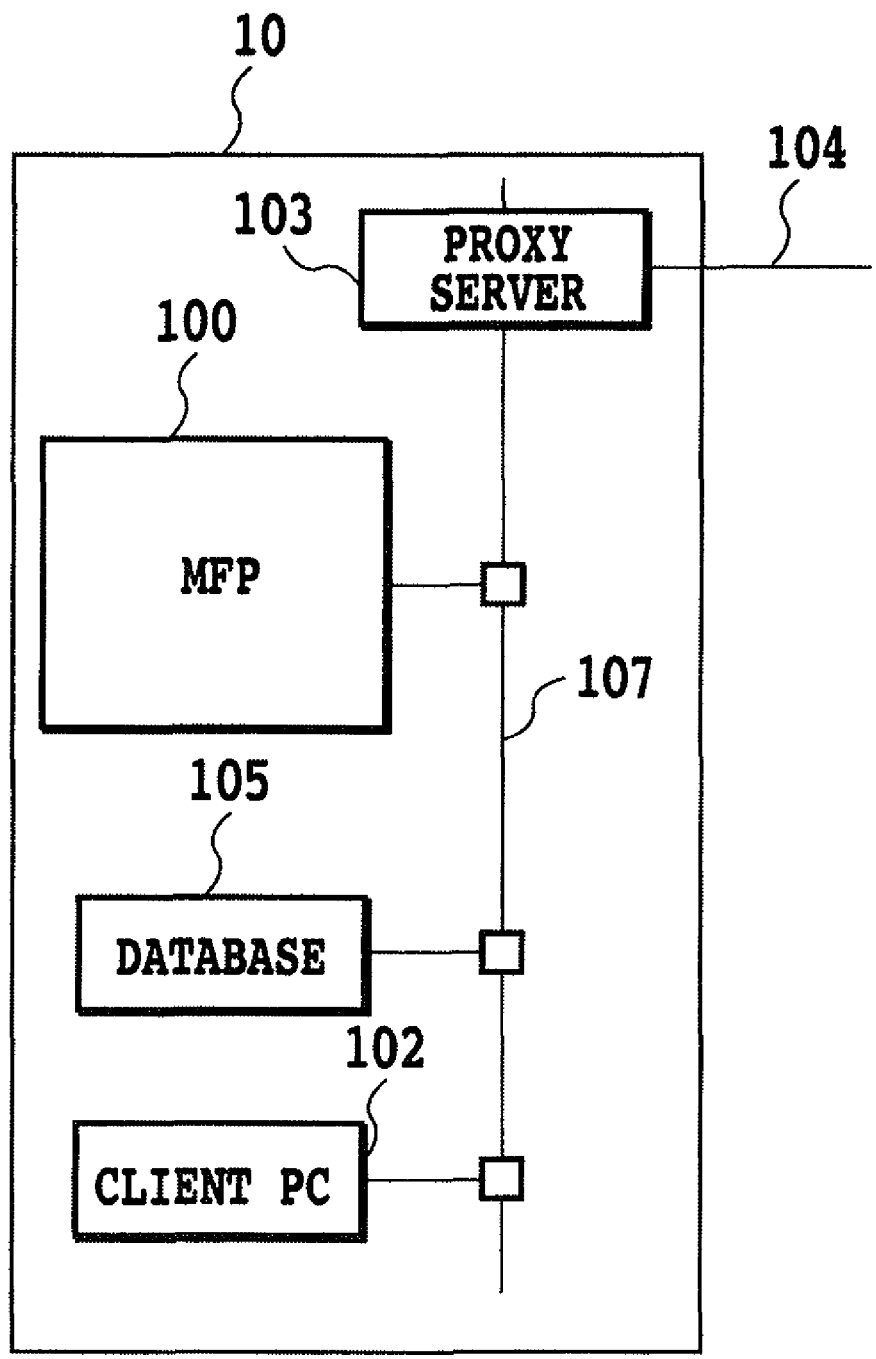
FIG. 1 is a diagram showing a system configuration of a first embodiment in accordance with the present invention.

FIG. 1 is a block diagram showing a configuration of an image processing system of the first embodiment in accordance with the present invention.

The image processing system is implemented in an environment in which an office 10 is connected to a network 104 such as the Internet.

An MFP (MultiFunction Peripheral) 100, a client PC 102 using the MFP 100, a database 105, and a proxy server 103 are connected to a LAN 107 constructed in the office 10. The MFP is a multifunction machine that implements a plurality of functions (copying function, printing function, transmitting function and the like). In addition, the LAN 107 in the office 10 is connected to the network 104 via the proxy server 103 of each office.

The configuration in FIG. 1 is only an example: there may be more than one of each component, and a plurality of offices as shown in FIG. 1 can be present and interconnected via the network 104. As for the network 104, it is a so-called communications network, and it is sufficient that it can perform data transmission and reception. Typically, the network 104 is implemented in the form of a single network or a combination of networks such as telephone circuits, a LAN, a WAN, dedicated digital lines, ATM circuits, frame relay lines, communications satellite circuits, cable television circuits, and data broadcasting radio circuits.

In addition, each client PC 102 has standard components (such as a CPU, RAM, ROM, hard disk, external storage device, network interface, display, keyboard, mouse and so on) to be mounted in a general-purpose computer.

Figure 2:
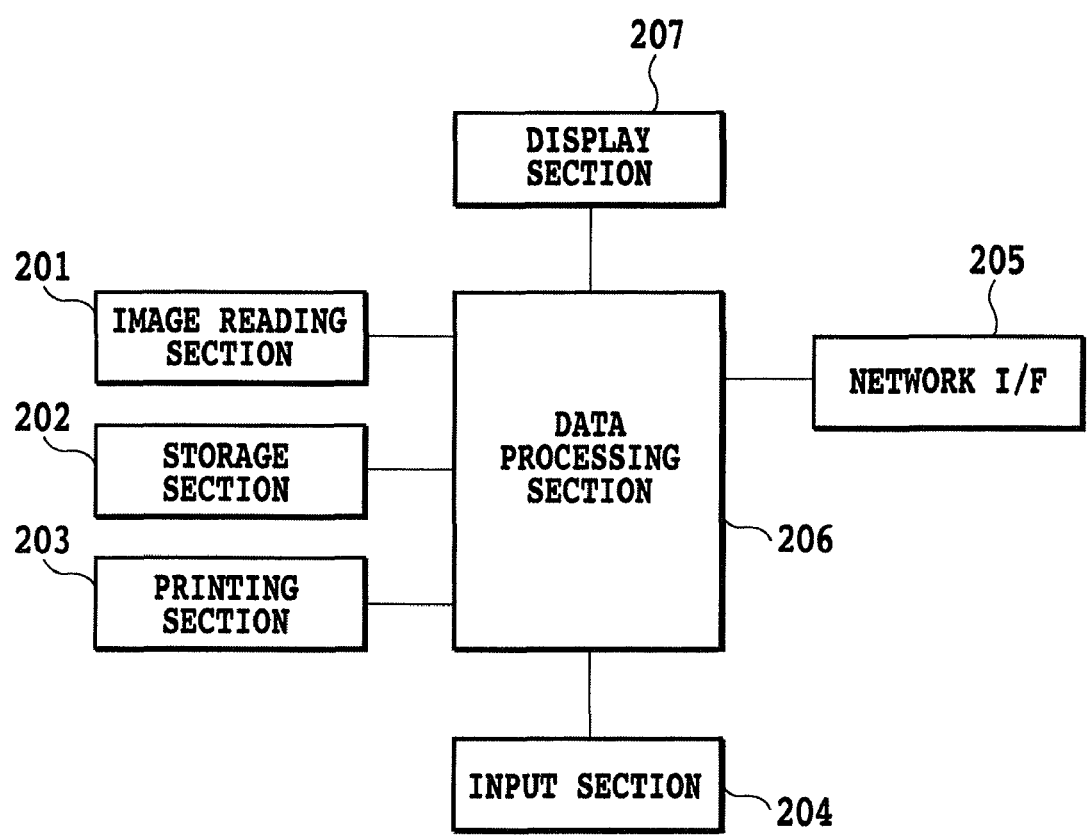
FIG. 2 is a block diagram showing a detailed configuration of an MFP of the first embodiment in accordance with the present invention.

FIG. 2 is a block diagram showing a detailed configuration of the image processing apparatus (MFP 100) of the first embodiment in accordance with the present invention.

In FIG. 2, the reference numeral 201 designates an image reading section including an automatic document feeder (ADF). The image reading section 201 irradiates an original document with light from a light source (not shown), first, and forms a reflected image of the original document on a solid-state image sensing device. Thus, it acquires the image read signal output from the solid-state image sensing device as bitmap data with a prescribed resolution (such as 600 dpi).

In addition, the MFP 100 has a copying function of printing an image corresponding to the image read signal on a recording medium with a printing section 203. When making a single copy of the original document image, a data processing section 206 performs the image processing of the image read signal to generate a recording signal, and the printing section 203 that receives the recording signal carries out printing on a recording medium. In contrast, when making a plurality of copies of the original document image, the data processing section 206 causes a storage section 202 to temporarily retain the recording signal of one page, and causes the printing section 203 to print it on recording mediums with sequentially outputting the recording signal thereto.

The communication function, via a network I/F 205, makes it possible to convert the bitmap data obtained from the image reading section 201 to the object data through processing which will be described later, and to transmit it to the database 105 to be stored. In addition, it also makes it possible to receive the object data stored in the database 105 for reuse, or to convert the object data to an image file with a vector data file format such as PDF and to transfer to the client PC 102. As a storage location of such data, besides the storage section 202 in the MFP 100 and database 105, a storage device of an external server (neither of which is shown) can be used. In this case, the data to be stored is transmitted to the external server connected through the proxy server 103 and network 104 shown in FIG. 1 via the network I/F 205 which is a communication means within the MFP 100, and is stored in the storage device of the external server. The stored data can be searched by a search function of each device.

The printing section 203 has a printing function of forming an image on a printing medium in accordance with the print data output from the client PC 102. To utilize the printing function, the data processing section 206 receives the print data output from the client PC 102 via the network I/F 205. Then, after the data processing apparatus 206 converts the print data to a recording signal in accordance with which the printing section 203 can print, it supplies the recording signal to the printing section 203, and the printing section 203 forms an image on a recording medium.

Operator instructions to the MFP 100 are provided from an input section 204 mounted on the MFP 100, and the operation corresponding to the instructions is controlled by a control section (not shown) in the data processing section 206. In addition, a display section (display unit) 207 displays the state of the operation input and the image data during the processing.

The storage section (storage device) 202 provides a storage area for storing object data acquired by the processing which will be described later, and an image processing buffer area used for various types of image processing by the data processing section.

[Object Data and Metadata Generating Processing]

Figure 3:
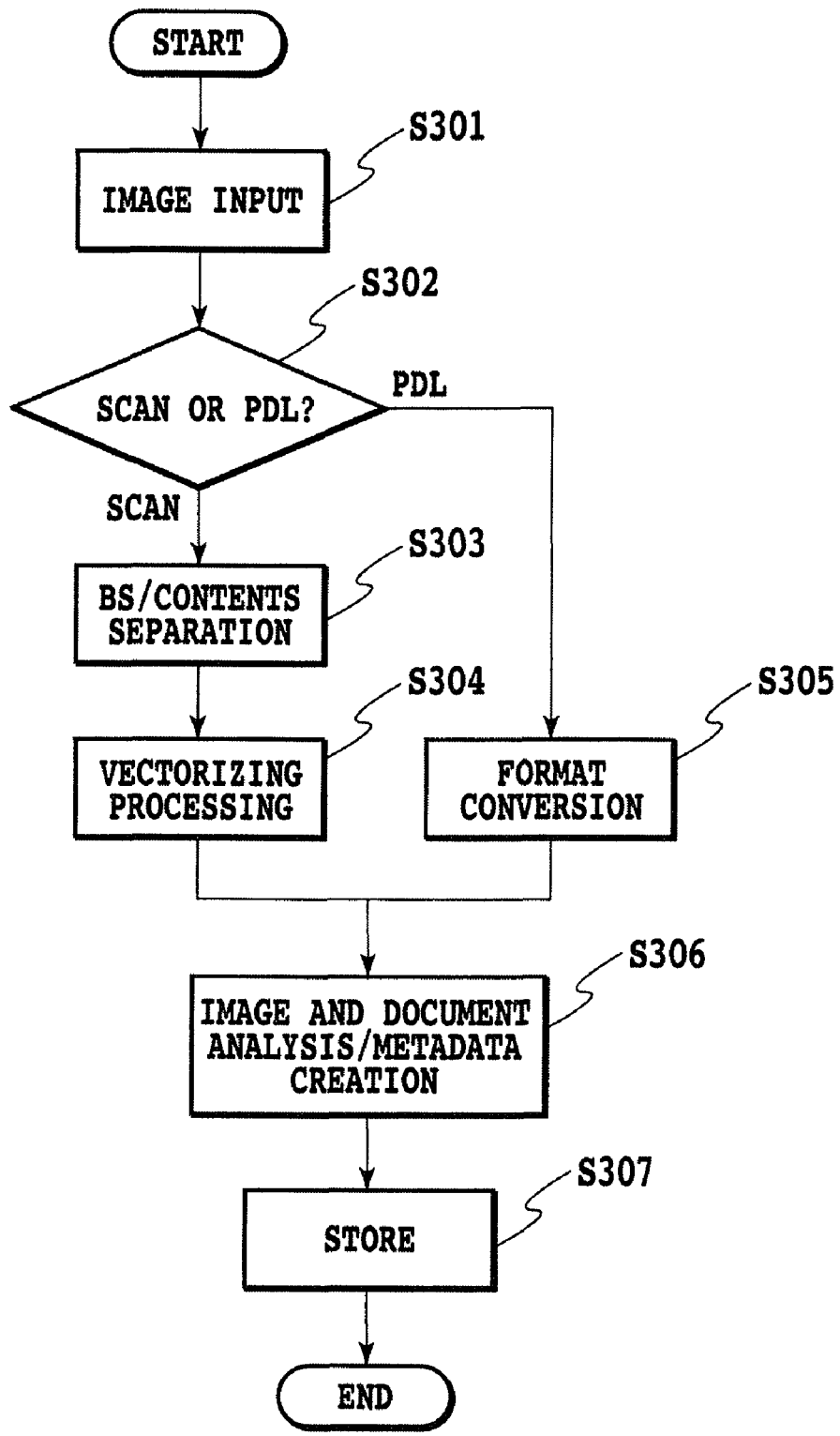
FIG. 3 is a flowchart showing a processing procedure of creating object data and metadata in the first embodiment in accordance with the present invention.

Next, the process of separating the data obtained by scanning or the data input as PDL data into individual objects, and of storing this data will be described with reference to the flowchart of FIG. 3.

First, at step S301, when the input is a SCAN job, the image reading section 201 of the MFP 100 scans the original document, and acquires a 600 dpi, 8 bit image signal, for example. The data processing section 206 performs preprocessing of the image signal, and stores it in the storage section 202 as the image data (bitmap data) of one page. When the input is described in a page description language (referred to as "PDL" from now on), the image data (vector data) of one page is stored in the PDL.

Next, when the input is scan data, a decision "SCAN" is made at step S302, and the processing proceeds to step S303. At step S303, the data processing section 206 carries out contents separating processing by performing block selection (BS). More specifically, the data processing section 206 divides the image data to be processed which the storage section 202 stores as text/graphic portions and halftone image portions, first. It further divides the text/graphic portions into blocks, each of which is treated as a paragraph, or into tables and figures consisting of lines, to make objects.

On the other hand, the data processing section 206 divides the halftone image portions into objects (blocks) independent from each other as blocks, such as image portions and background portions, which consist of blocks separated in rectangles. Although the present embodiment takes TEXT (text), GRAPHIC (thin line, figure and table) and IMAGE (image) as an example of the attributes, the types of attributes are not limited thereto. It goes without saying that other types of attributes can be employed in accordance with applications or purposes, and that it is not necessary to use all the attributes. In the present embodiment, the term "block selection processing" refers to region dividing processing that divides the image into regions (blocks indicating the regions of the individual objects) for respective attributes by analyzing the image.

Next, at step S304, vectorizing processing is performed on each object separated. The vectorizing processing uses an OCR to carry out the character recognition of the objects decided as TEXT attribute, recognizes size, style and font of the characters, and converts the characters obtained by scanning the original document to visually faithful font data. On the other hand, the objects such as tables and figures consisting of lines with the GRAPHIC attribute are outlined. In addition, the image objects with the IMAGE attribute are subjected to JPEG compression individually as the image data.

The vectorizing processing of the various objects is executed in accordance with the object information of the individual objects, and the results thereof are stored as the object data with a format consisting of the metadata and image information which will be described later and is available in the MFP 100.

In contrast, when the input is PDL data, a decision "PDL" is made at step S302 and the processing proceeds to step S305. At step S305, the input PDL data is converted to object data on an object by object basis, which will be described later, and the object data are stored. In this course, the attribute data (such as TEXT, GRAPHIC and IMAGE), the metadata and the layout information contained in the PDL data are also converted and stored.

The term "metadata" mentioned here refers to the information on the object such as characteristics (object size, font size and the like) and names of the objects and to features representing relative relationships with other objects in the original document to be used by the editing processing which will be described later.

Next, at step S306, the data processing section 206 performs image analysis and document analysis for each object, thereby obtaining information indicating the contents of the object itself. In addition, it corrects the metadata generated at step S304 and step S305, and adds new information. First, considering that the SCAN job and PDL job generate different object information, the present embodiment prepares three attributes of TEXT, GRAPHIC and IMAGE so that the same sort of image data undergo the same processing from this point forward. When the attribute of the object is TEXT, a summary of the document is made from the results of the document analysis and is added to the metadata. When the object information is GRAPHIC, the image analysis is made to extract features and more detailed information such as name, diagram and line drawing, and the information is added to the metadata. When the object information is IMAGE, the image analysis is carried out to extract features and more detailed information such as name, portrait and landscape, and the information is added to the metadata. However, the information added to the metadata here is only an example, and is not limited to it. Any information can be added as long as it relates to the individual objects.

Next, at step S307, the object data acquired in the processing up to the foregoing step S306 are stored in the storage section 202 or database 105, whereby the object data are registered. The object data is not necessarily registered. For example, if the storage section 202 has already stored the same or similar object data, the registering is omitted, or another decision processing can be made as to whether the object data is to be registered or not.

[Object Data and Metadata]

Next, the object data and the metadata will be described with reference to FIG. 4.

Figure 4:
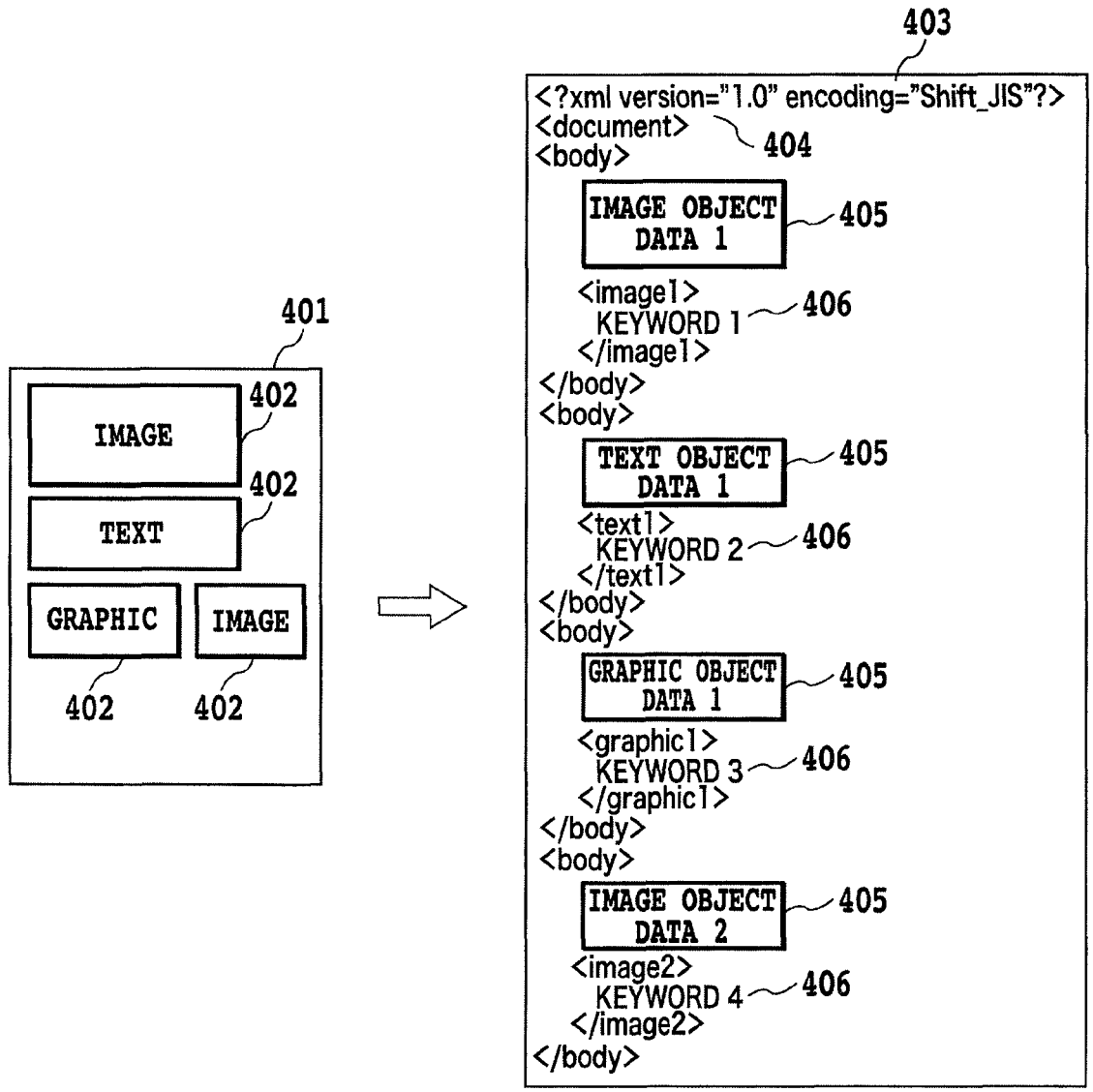
FIG. 4 is a diagram for illustrating an object generating process in the first embodiment in accordance with the present invention.

The reference numeral 403 of FIG. 4 designates an example of a data structure of the object data in the present embodiment.

The object data 403 is composed of layout information 404 describing its structure, each object data 405 with an attribute of IMAGE, GRAPHIC or TEXT, and metadata 406 describing keyword information for searching each data 405 and the like. The metadata 406 included in the object data 403 in this way can associate each object data 405 with the keyword registered for each object data.

Each object data 405 of the IMAGE, GRAPHIC or TEXT and the metadata 406 are acquired by performing the object data generating processing described above on a paper original document 401 including the objects 402 with the attributes of IMAGE, GRAPHIC and TEXT.

[Editing Function 1 of Object Data]

Next, the editing function of the object data in the present embodiment will be described with reference to FIG. 5, FIG. 6, FIG. 7 and FIG. 9.

Figure 5:
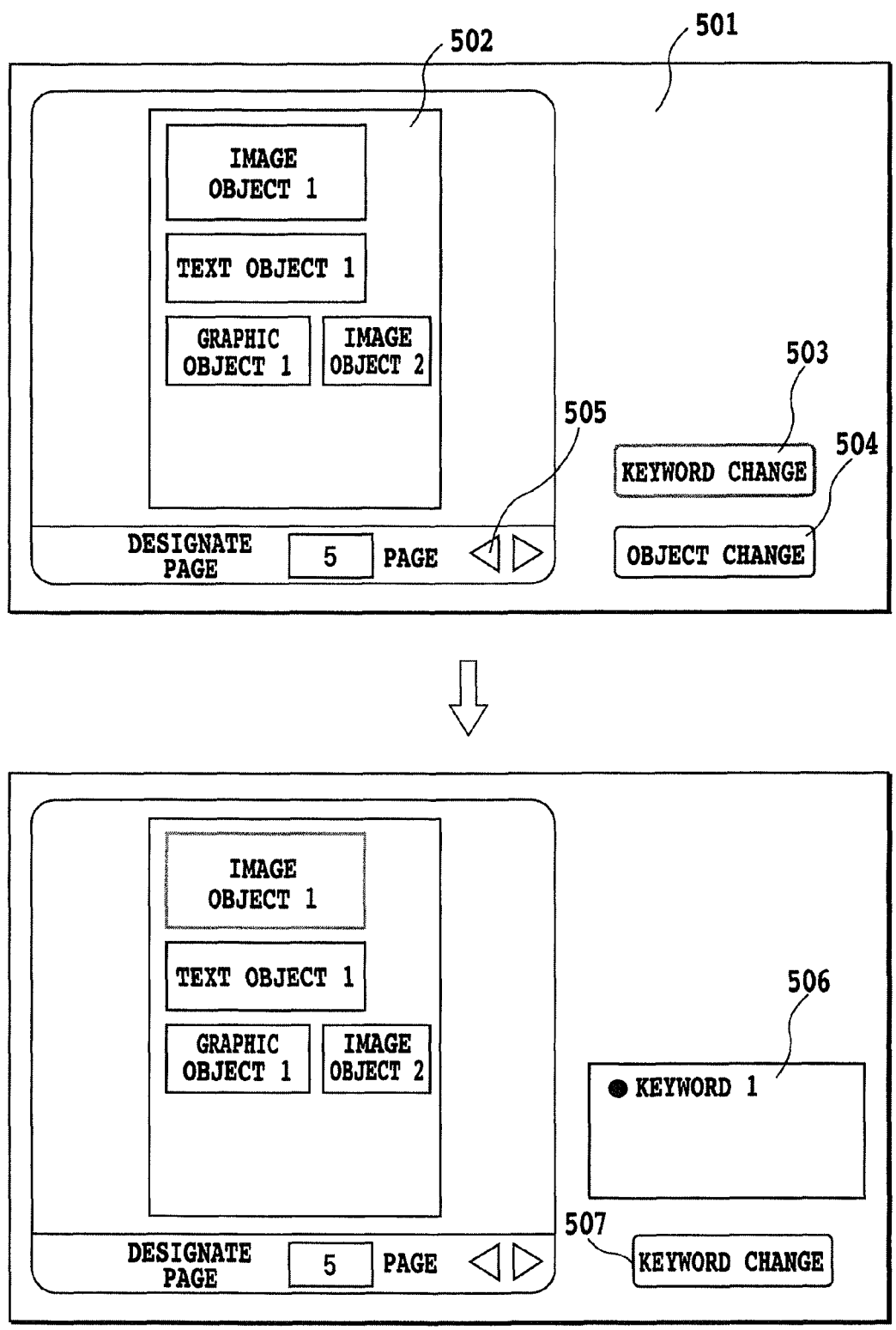
FIG. 5 shows an example of the transition of an operation screen in the first embodiment in accordance with the present invention.
Figure 6:
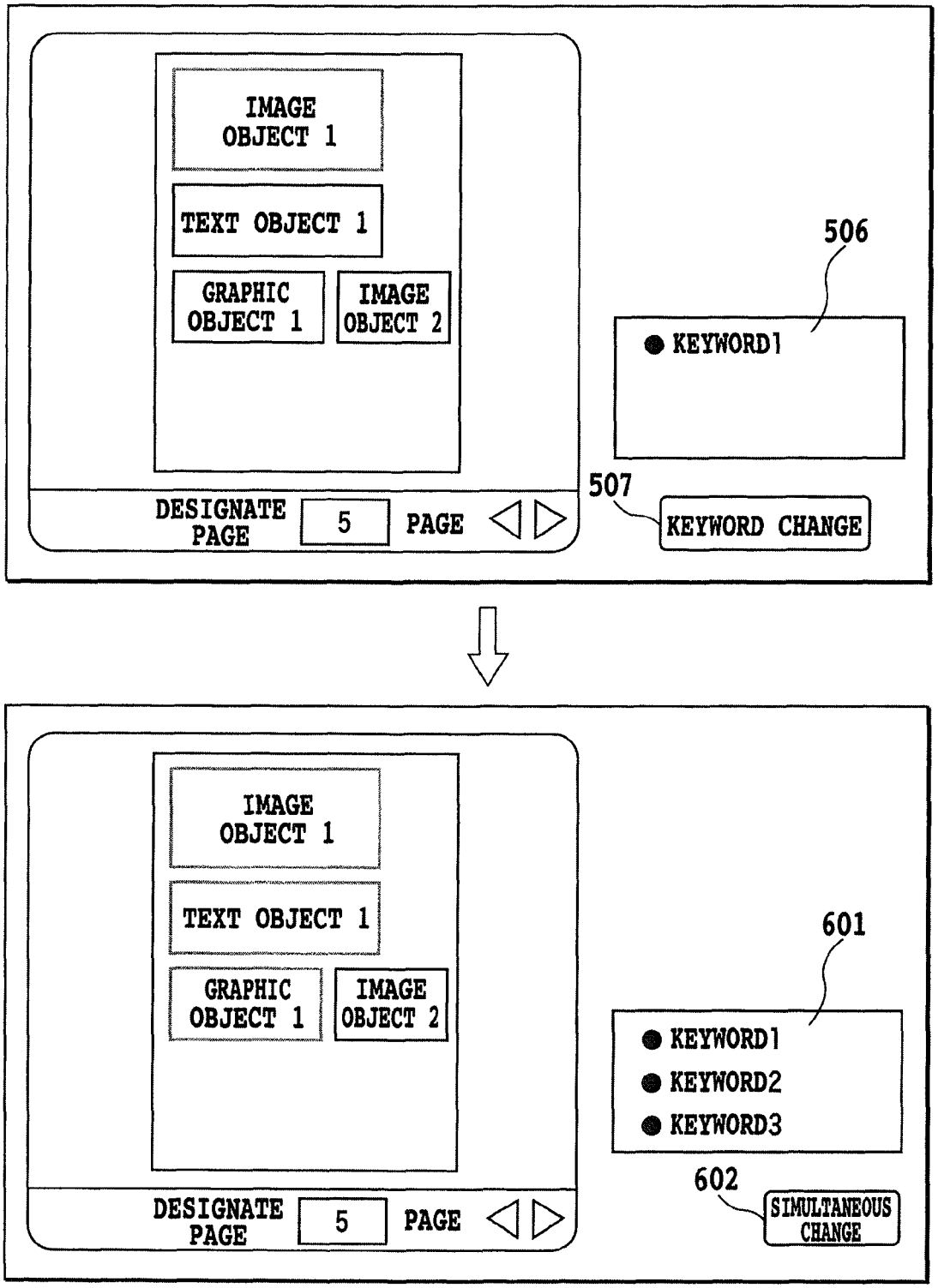
FIG. 6 shows an example of the transition of an operation screen in the first embodiment in accordance with the present invention.
Figure 7:
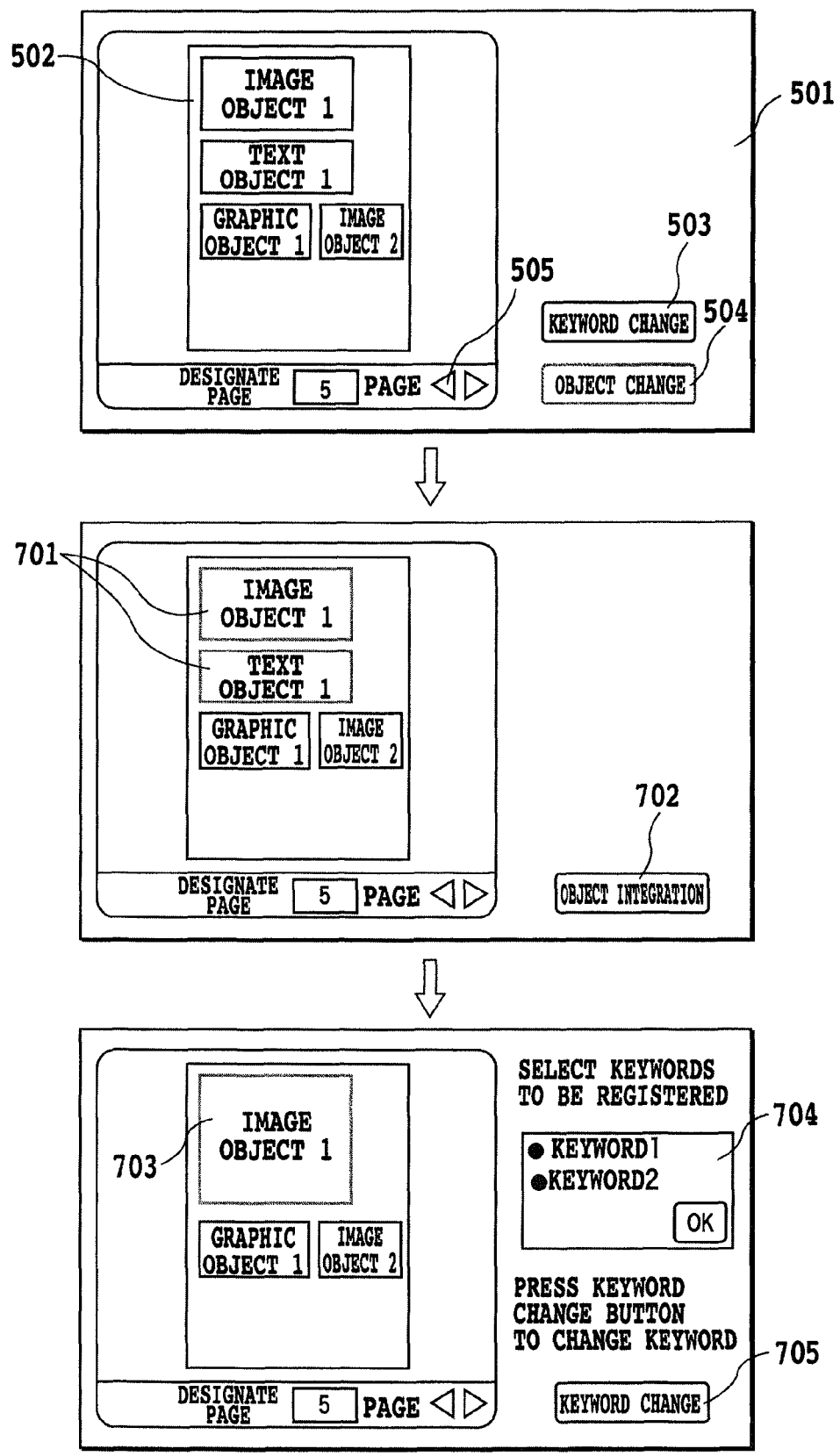
FIG. 7 shows an example of the transition of an operation screen in the first embodiment in accordance with the present invention.

FIG. 5, FIG. 6 and FIG. 7 are diagrams each showing an example of the operation screen in the present embodiment. In particular, the operation screen based on a GUI (graphical user interface) is an example of the operation screen of the operation section consisting of the input section 204 and display section 207 shown in FIG. 2.

The operation screen 501 is shown as a configuration example in which the input section 204 and the display section 207 are integrated. It is assumed in the example that the input section 204 and the display section 207 are composed of a touch screen and an LCD, respectively. It goes without saying that they can be independently composed of hard keys (a keyboard) or a pointing device, such as a mouse pointer, as the input section 204, and a CRT as the display section 207 and the like.

The operation screen 501 of FIG. 5 is an example of displaying a document stored in the storage section 202 after performing the "object data and metadata generating processing" described above on the scan data obtained by scanning the paper original document 401 with the MFP 100. As shown in FIG. 5, a state in which the scan data is divided into the individual object data of IMAGE, TEXT and GRAPHIC can be visualized and displayed as a thumbnail image 502. In addition, each object can be selected freely by touching the object in the thumbnail image 502 on the display unit.

Here, if a user selects Image Object 1 in the thumbnail image 502 and presses a keyword change button 503, the screen makes the transition and a keyword 506 corresponding to the selected object is displayed (see the lower portion of FIG. 5). The keyword displayed here is the keyword recorded in the metadata 406 included in the foregoing object data 403. Although only a single keyword is displayed in the explanation here, if a plurality of keywords is registered, it is also possible to display them.

Figure 9:
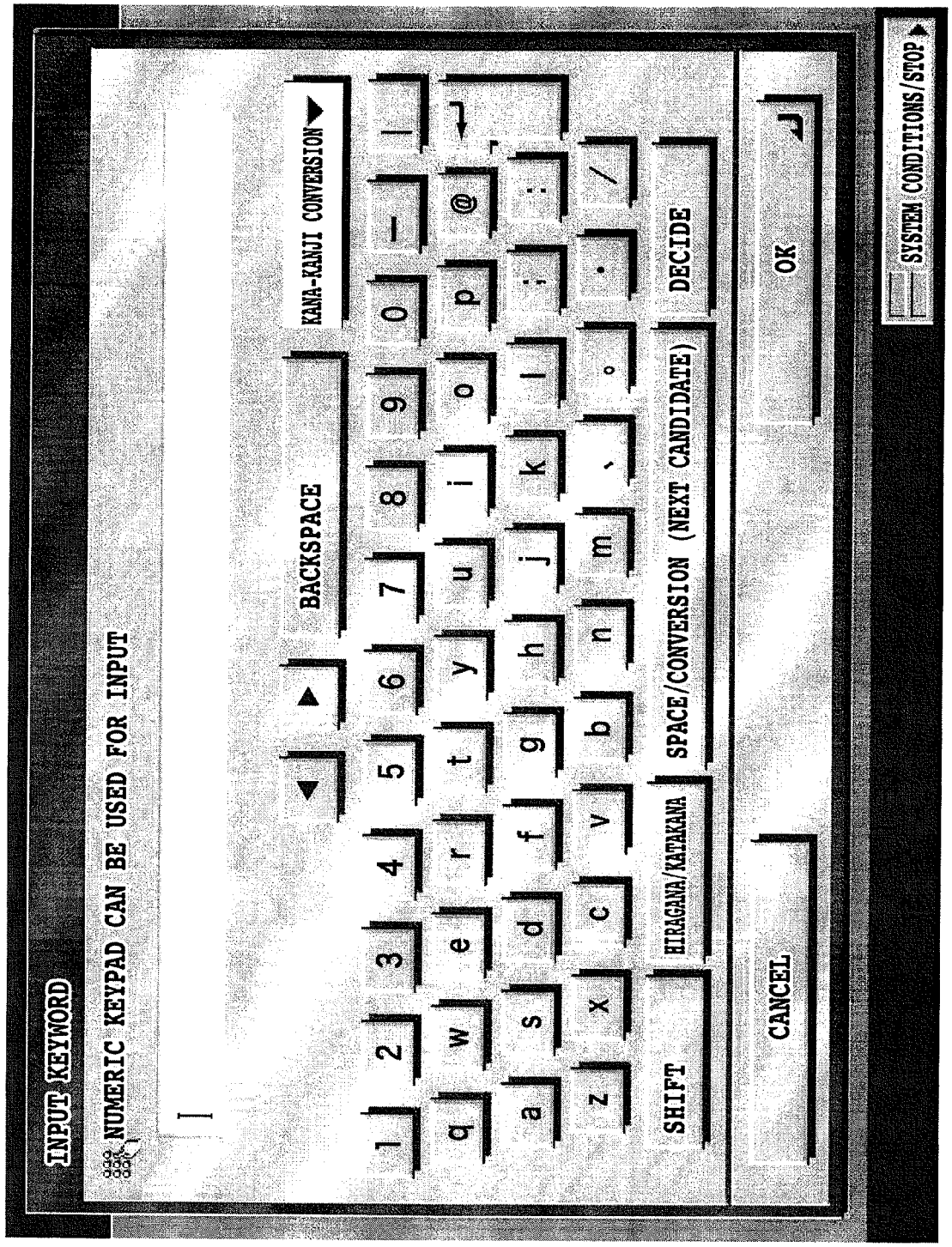
FIG. 9 is an example of an input screen for changing a keyword in the second embodiment in accordance with the present invention.

In addition, if the user presses the keyword change button 507 when the keyword 506 is displayed, the keyboard shown in FIG. 9 is displayed. This enables the user to change the keyword 506 freely by inputting a keyword the user wishes, thereby improving the search ability by the keyword.

Although the keyword change for only one object is possible in the example of FIG. 5, the user can select a plurality of objects as shown in FIG. 6 (capable of multiple selection). If the selection of the plurality of objects is allowed, and the user makes the multiple selection, a list of a plurality of keywords 601 corresponding to the plurality of objects selected is displayed (see the lower portion in FIG. 6). In this case, the display is made in such a manner that the user can recognize which keyword is assigned to which object selected. Then, when the user presses a simultaneous change button 602, the keyboard shown in FIG. 9 is displayed, and the user can input a desired keyword via the keyboard, which makes it possible to change collectively the plurality of keywords 601 to desired keywords. In this case, it is also possible to utilize the keyword assigned before simultaneous change to each object. The function can improve the user's convenience when he or she wants to change the keywords of the related objects to the same keyword collectively. Although the present embodiment demonstrates only an example of selecting a plurality of objects on a page, using a next page button 505 enables simultaneous selection of a plurality of objects on a plurality of pages, thereby enabling simultaneous change of the keywords.

Next, an example of integrating individual objects will be described with reference to FIG. 7.

When the user presses an object change button 504, selects a plurality of objects 701 displayed in the thumbnail image 502, and presses an integration button 702 of the objects, the selected objects are integrated into a single object 703. Although a new keyword must be registered in connection with the integration of the objects, it is also possible to choose an old keyword before the integration. In this case, keywords 704 having been registered before the integration are displayed so that the user can select one or more keywords, and the keywords selected are assigned to the objects. In addition, although an example is explained of the user to select the keywords every time the integration processing is made, this is not essential. For example, a configuration is also possible which makes a setting in advance on an initial setting screen in such a manner as to choose all the old keywords of the objects to be integrated, and which automatically assigns them to the object after the integration as the initial keywords.

To assign a brand-new keyword, the user can press a keyword change button 705, and register any desired keyword from the keyboard screen of FIG. 9. Thus, even if the individual object data have not been divided into object units the user desires, the user can reintegrate into any desired object afterward, which improves the reusability of the object data.

As for the object data 403, although it is stored in the storage section 202 in the MFP 100 in the present embodiment, the database 105 on the network can also be used as a destination for storage.

Second Embodiment

Next, a second embodiment in accordance with the present invention will be described.

Configurations of the image processing system and MFP in the present embodiment are the same as those of the image processing system (FIG. 1) and MFP (FIG. 2) described in the foregoing first embodiment. In addition, as for "object data and metadata generating processing" and "object data and metadata", they are the same as the corresponding contents described in the first embodiment. Accordingly, their description is omitted here, and only the editing function of the object data will be described below.
[Editing Function 2 of Object Data]

The editing function of the object data in the present embodiment will be described below with reference to FIG. 8 and FIG. 9.

Figure 8:
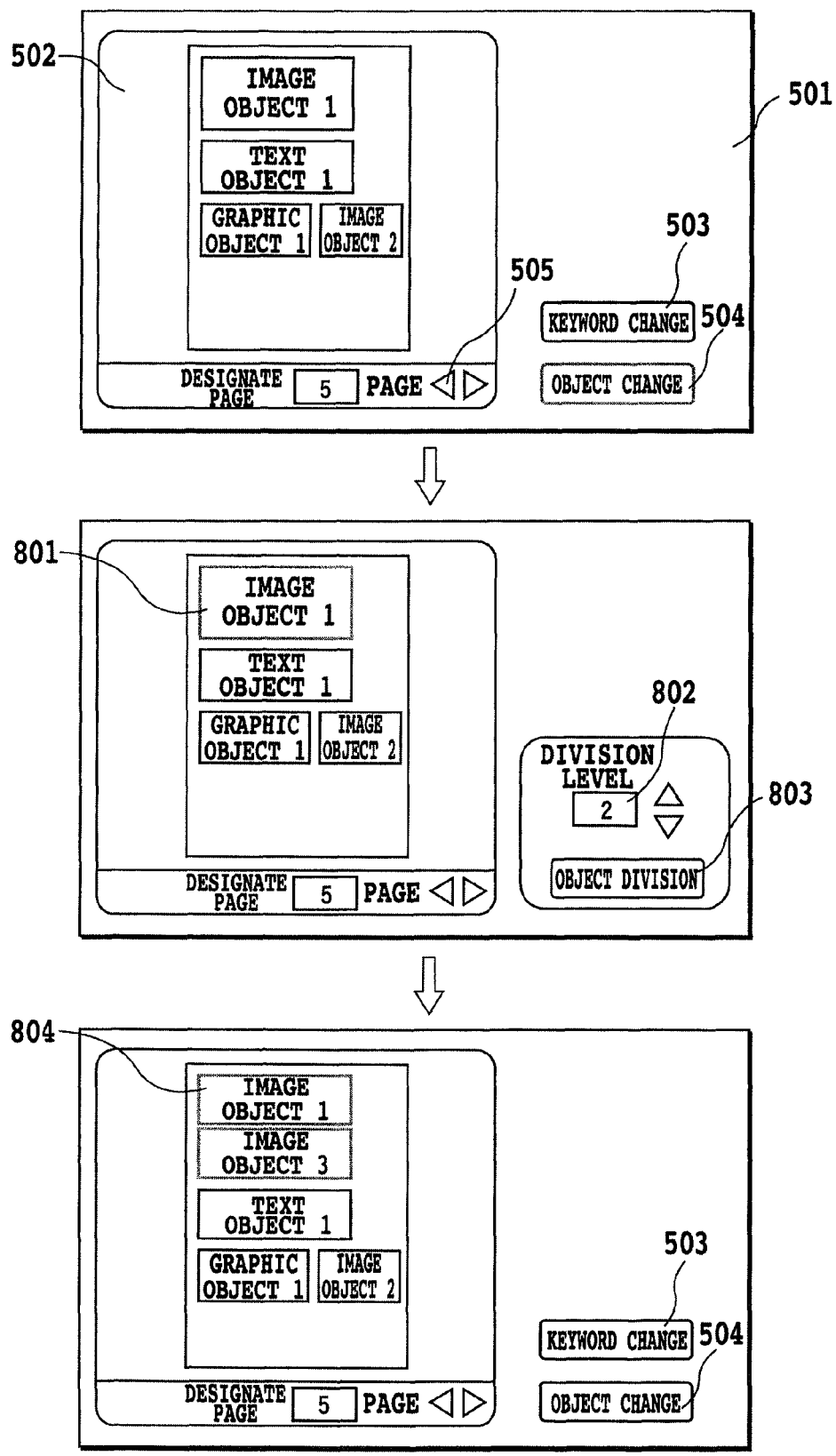
FIG. 8 is a diagram showing an operation flow in a second embodiment in accordance with the present invention.

FIG. 8 is a diagram showing an example of the operation screen in the present embodiment. In particular, the operation screen based on a GUI is an example of the operation screen of the operation section consisting of the input section 204 and display section 207.

The operation screen 501 is shown as a configuration example of the operation screen of the operating section in which the input section 204 and the display section 207 are integrated. An example is assumed in which the input section 204 and the display section 207 are composed of a touch screen and an LCD, respectively. It goes without saying that they can be independently composed of hard keys (a keyboard) or a pointing device like a mouse pointer as the input section 204, and a CRT as the display section 207 and the like.

The operation screen 501 of FIG. 8 is an example of displaying a document stored in the storage section 202 after performing the "object data and metadata generating processing" described above on the scan data obtained by scanning the paper original document 401 with the MFP 100. The operation screen 501 can display the state in which the scan data is divided into a plurality of object data with the attribute of one of IMAGE, TEXT and GRAPHIC as a thumbnail image 502. In addition, each object can be selected freely by touching the object in the thumbnail image 502.

Here, if the user presses the object change button 504, the screen makes the transition. After selecting the Image Object 1 (801) in the thumbnail image 502 of the screen after the transition (refer to the middle of FIG. 8), the user assigns any desired value to a division level 802. Then, when the user presses an object division button 803, the division of the object selected becomes possible at the specified division level (division number).

In the present embodiment, the division level indicates the number of objects after the object division. Thus, if it is set at 2, the object 801 is divided into two parts as denoted by the reference numeral 804. As for a dividing line indicating the position for dividing the object, it is assumed to be determined at a desired boundary of the parts by analyzing the histograms in horizontal and vertical directions of each object, and/or by analyzing continuity of pixels of the same color (such as concatenated black pixels). In addition, when carrying out the division processing, the MFP 100 sets (registers) the keyword that has been assigned to the object (801) before the division as the initial keyword of each object after the division. After that, if the user requires changing the keyword assigned to the object after the division, the user can change the keyword by pressing the keyword change button 503. Thus, if the objects have been formed in units greater than the user desires, the user can divide the object into a plurality of objects as he or she desires. The function can further improve the reusability of the object data.

Other Embodiments

The present invention is further applicable not only to a system consisting of a plurality of devices (such as a computer, an interface unit, a reader and a printer), but also to an apparatus consisting of a single device (such as a multifunction machine, a printer or a fax machine).

In addition, the object of the present invention can be achieved by reading a program code for implementing the procedures of the flowcharts shown in the embodiments described above from a storage medium in which the program code is stored, and by executing the program code with a computer (or CPU or MPU) of the system or apparatus. In this case, the program code itself read from the storage medium implements the functions of the foregoing embodiments.

Accordingly, the program code or a computer readable storage medium that stores/records the program code constitutes the present invention as well.

As the storage medium for supplying the program code, a floppy (registered trademark) disk, hard disk, optical disk, magneto-optical disk, CD-ROM, CD-R, magnetic tape, non-volatile memory card, ROM and the like can be used.

The functions of the foregoing embodiments are implemented by executing the read-out program with the computer. In addition, the term "execution of the program" includes the case where an OS and the like working on the computer perform part or all of the actual processing according to the instructions of the program.

Furthermore, the functions of the foregoing embodiments can also be implemented by a function expansion board inserted into a computer or a function expansion unit connected to the computer. In this case, the program read out of the storage medium is written into a memory in the expansion board inserted to the computer or into a memory in the expansion unit connected to the computer. After that, according to the instructions of the program, the CPU in the expansion board or in the expansion unit executes part or all of the actual processing. Such processing by the function expansion board or function expansion unit can also implement the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-197733, filed Jul. 30, 2007, which is hereby incorporated by reference herein in its entirety.

What is claimed is:

1. An image processing apparatus comprising:
    means for extracting objects included in an original document;
    obtaining means for obtaining a keyword for each of the extracted objects by performing at least one of image analysis and document analysis for each of the extracted objects;
    means for storing object data of each of the extracted objects with the keyword that is obtained for each of the extracted objects by the obtaining means in a storage device;
    visualizing means for visualizing the objects included in the original document based on the stored object data on a display unit;
    selecting means for selecting at least two objects from the visualized objects in accordance with a user instruction;
    keyword-displaying means for simultaneously displaying the keywords stored with the at least two objects selected by said selecting means, wherein the keyword-displaying means does not display the keywords stored with objects that are not selected by said selecting means; and
    keyword assigning means for changing the displayed keywords into inputted keywords based on a user instruction, thereby collectively changing the keywords being stored with the object data of the selected at least two objects into the inputted keywords.

2. The image processing apparatus as claimed in claim 1, further comprising integration means for integrating the plurality of object data corresponding to the at least two objects selected by said selecting means into one object data, wherein said keyword assigning means assigns, when said integration means carries out integration, a keyword to the object data after the integration.

3. The image processing apparatus as claimed in claim 1, wherein
    said selecting means selects one of the visualized objects in accordance with the user instruction;
    said image processing apparatus further comprises division means for dividing the one object selected by said selecting means into a plurality of objects, the keyword that has been assigned to the selected one object being set as the initial keyword of each object after the division,
    wherein said keyword assigning means assigns, when the division means carries out the division, an inputted keyword to each of the divided objects.

4. The image processing apparatus as claimed in claim 1, further comprising means for searching for the object data in accordance with the keyword associated with the object data.

5. The image processing apparatus as claimed in claim 1, wherein said selecting means selects the at least two objects from a plurality of pages in accordance with the user instruction.

6. The image processing apparatus as claimed in claim 1, further comprising communication means for transmitting the object data and keyword to a storage device of an external server to be stored.

7. The image processing apparatus as claimed in claim 3, further comprising means for designating a number of division at a time of dividing the object data by said division means.

8. A control method for an image processing apparatus, comprising:
    a step of extracting objects included in an original document
    a step of obtaining a keyword for each of the extracted objects by performing at least one of image analysis and document analysis for each of the extracted objects;
    a step of storing object data of each of the extracted objects with the keyword that is obtained for each of the extracted objects by the step of obtaining in a storage device;
    a step of visualizing the objects included in the original document based on the stored object data stored in said storage device on a display unit;
    a selecting step of selecting at least two objects from the visualized objects in accordance with a user instruction via a GUI on said display unit;
    a step of simultaneously displaying on said display unit the keywords stored with the at least two objects selected by the step of selecting, wherein the step of displaying does not display the keywords stored with objects that are not selected by the step of selecting; and
    a keyword assigning step of changing the displayed keywords into inputted key words based on a user instruction, thereby collectively changing the keywords being stored with the object data of the selected at least two objects into the inputted keywords.

9. A computer readable storage medium that retrievably stores a program for causing a computer for controlling an image processing apparatus to execute:
    a step of extracting objects included in an original document
    a step of obtaining a keyword for each of the extracted objects by performing at least one of image analysis and document analysis for each of the extracted objects;
    a step of storing object data of each of the extracted objects with the keyword that is obtained for each of the extracted objects by the step of obtaining in a storage device;
    a step of visualizing the objects included in the original document based on the stored object data stored in said storage device on a display unit;

a selecting step of selecting at least two objects from the visualized objects in accordance with a user instruction via a GUI on said display unit;

a step of simultaneously displaying on said display unit the keywords stored with the at least two objects selected by the step of selecting, wherein the step of displaying does not display the keywords stored with objects that are not selected by the step of selecting; and a keyword assigning step of changing the displayed keywords into inputted key words based on a user instruction, thereby collectively changing the keywords being stored with the object data of the selected at least two objects into the inputted keywords.

* * * * *